United States Patent [19]
Hosoda et al.

[11] 3,921,465
[45] Nov. 25, 1975

[54] APPARATUS FOR CONVERTING ROTARY TO LINEAR RECIPROCATING MOTION WITH A DECELERATED PORTION IN ITS STROKE

[75] Inventors: Toru Hosoda, Zama; Mitsuru Seki, Sagamihara, both of Japan

[73] Assignee: Nissan Motor Company Limited, Japan

[22] Filed: Mar. 6, 1974

[21] Appl. No.: 448,635

[30] Foreign Application Priority Data
Mar. 10, 1973 Japan................. 48-27623

[52] U.S. Cl.................... 74/52; 74/394
[51] Int. Cl.².................... F16H 21/32
[58] Field of Search................. 74/52, 394

[56] References Cited
UNITED STATES PATENTS

| | | | |
|---|---|---|---|
| 2,775,140 | 12/1956 | Loos | 74/394 |
| 2,845,808 | 8/1958 | Stover | 74/394 |
| 3,076,351 | 2/1963 | Moss | 74/394 |
| 3,468,173 | 9/1969 | Fracke | 74/52 |
| 3,507,162 | 4/1970 | Nomura et al. | 74/394 |

*Primary Examiner*—Benjamin W Wyche
*Assistant Examiner*—Wesley S. Ratliff, Jr.
*Attorney, Agent, or Firm*—Robert E. Burns; Emmanuel J. Lobato; Bruce L. Adams

[57] ABSTRACT

An apparatus has a crankshaft, a slider, a sun gear, a planetary gear engaged with the sun gear and supported by a rockable member pivotally secured to the crankshaft to provide a decelerated portion in the linear stroke of the slider.

4 Claims, 6 Drawing Figures

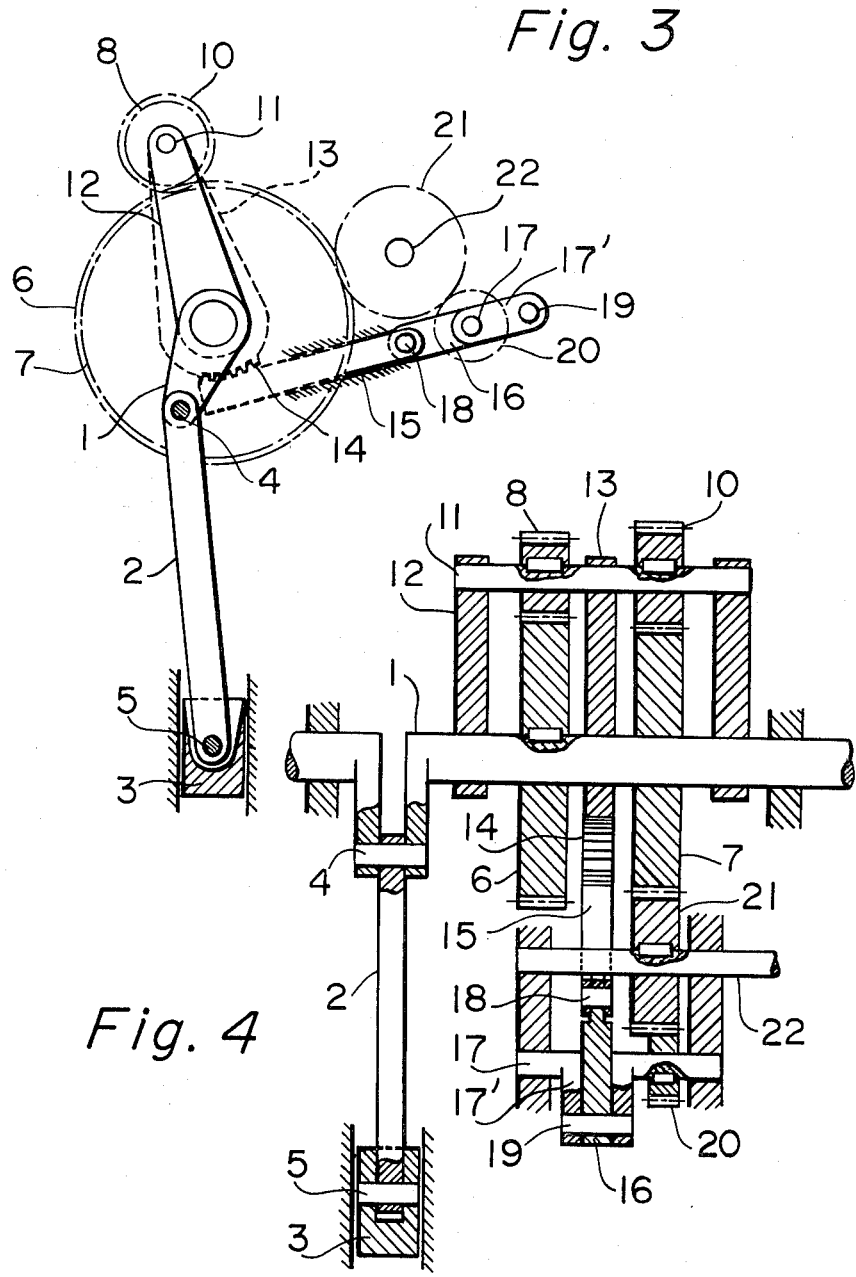

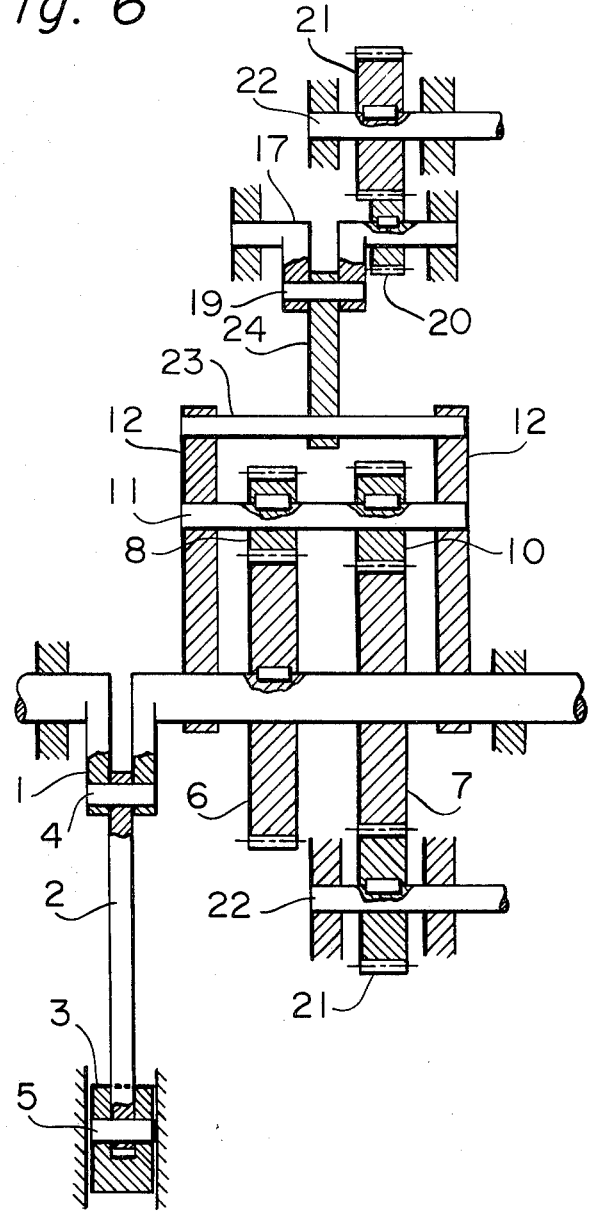

APPARATUS FOR CONVERTING ROTARY TO LINEAR RECIPROCATING MOTION WITH A DECELERATED PORTION IN ITS STROKE

BACKGROUND OF THE INVENTION

This invention relates generally to a crank mechanism type driving device, and particularly to an apparatus for generating a reciprocating motion having a decelerated portion in its stroke.

A conventional crank mechanism type driving device for use in a materials-handling system, e.g., a lifting device and a conveying device has a crank to reciprocate with a slider for receiving and delivering an article. In such a device, the reciprocating motion curve of the slider driven by the crank is a sine curve, and the displacing speed curve thereof also is a sine curve. As is well known, the slider reaches its maximum speed at around the middle of its stroke and reaches zero at the end of its stroke. If the article is received or delivered at the middle of the stroke, it may be damaged due to its high speed. Therefore, it is desired to reduce the speed of the slider at the middle of its stroke, in some practical cases.

SUMMARY OF THE INVENTION

It is, therefore, an object of the present invention to provide an apparatus for generating a reciprocating motion having a decelerated portion in its stroke, which may prevent damage to an article which is being handled by a materials-handling device.

According to the present invention, there is provided an apparatus for generating a reciprocating motion having a decelerated portion within its stroke, comprising a reciprocally movable slider, a crankshaft connected to the slider for converting a rotary motion to a linear reciprocating motion of the slider, a sun gear secured to the crankshaft, a planetary gear engaged with the sun gear, a rockable member pivotally secured to the crankshaft and supporting the planetary gear, wherein a decelerated portion is provided in the middle of the reciprocating motion of the slider by rocking the rockable member about the crankshaft while the slider is reciprocally moved by transmitting the rotary motion through the planetary gear, and the sun gear to the crankshaft.

BRIEF DESCRIPTION OF THE DRAWINGS

This and other objects, features and advantages of the apparatus for generating a reciprocating motion having a decelerated portion at the middle of its stroke according to the present invention will become fully apparent from the following description taken in conjunction with the accompanying drawings, in which:

FIG. 3 is a side view of one embodiment of an apparatus constructed according to the present invention;

FIG. 4 is a sectional view of the apparatus shown in FIG. 3;

FIG. 6 is a sectional view of the apparatus shown in FIG. 5.

Figure 1:
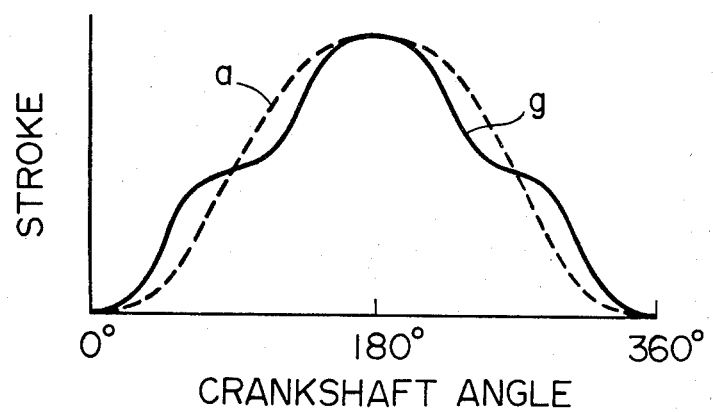
FIG. 1 shows a graph comparing a displacement curve of a slider used for an apparatus according to the present invention and that of a slider used for a conventional apparatus.
Figure 2:
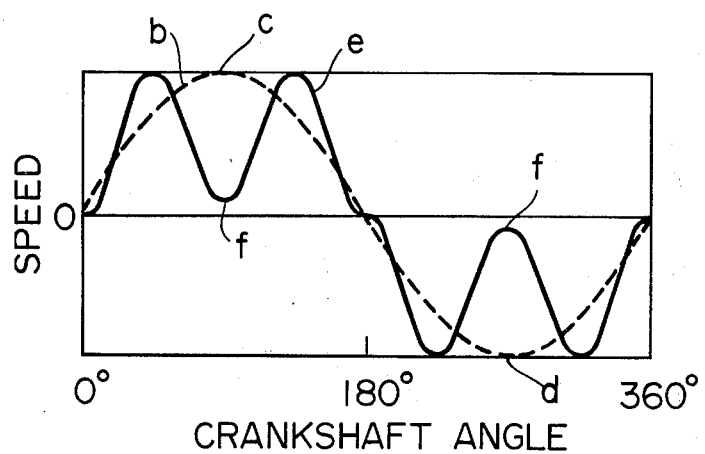
FIG. 2 is a graph comparing a displacing speed curve of a slider used for an apparatus of the present invention and that of a slider used for a conventional apparatus.

As shown by a curve $a$ in FIG. 1, the displacement of a slider (driven by a crank) in a conventional crank mechanism type driving device is a sine curve and the displacing speed of the slider varies as shown by the curve $b$ in FIG. 2. In such driving device, the displacing speed of the slider reaches its maximum at the middle of its stroke at the portions designated by $c$ and $d$ in FIG. 2. Accordingly, if this driving device is used for a lifting device or conveying device, an article being handled may be damaged, particularly when the article is delivered at high speed.

Therefore it is desired to provide a reciprocating displacement curve as designated by $g$ in FIG. 1 varying its speed having a decelerated portion $f$ in the middle of its stroke as illustrated by the curve $e$ in FIG. 2.

Referring now to FIGS. 3 and 4, which show one embodiment of an apparatus of the invention, numeral 1 indicates a crankshaft, to which a connecting rod 2 is pivotally connected, and a slider 3 is also pivotally connected to the connecting rod 2, for reciprocally moving the slider 3. In more detail, the connecting rod 2 is connected at one end thereof to the crank of the crankshaft 1 by a pin 4 and is connected at the other end thereof to the slider 3 by a pin 5.

A sun gear 6 is fixedly secured to the crankshaft 1, and another sun gear 7 is rotatably mounted thereon and axially spaced from the sun gear 6 in a manner that planetary gears 8 and 10 are engaged with the sun gears 6 and 7, respectively, and fixedly mounted on a common shaft 11. The shaft 11 is rotatably journaled at the free ends of rockable links 12 rotatably supported by the crankshaft 1 at the other ends thereof. A sector gear 13 rotatably supported by the crankshaft 1 is rotatably supported by the shaft 11 as well.

Teeth 14 are formed at the end of the sector gear 13 near the crankshaft 1 in such a manner that a rack 15 is engaged with the teeth 14 of the sector gear 13. In order to provide a predetermined reciprocating motion of the rack 15, the other end of the rack 15 is connected through a connecting rod 16 to the crank 17' of a crankshaft 27 by pins 18 and 19, respectively.

A pinion gear 20 is secured to the crankshaft 17 by a key in such a manner that a drive gear 21 is engaged with the pinion gear 20 and the sun gear 7. The drive gear 21 is secured by a key to an output shaft 22 of a prime mover (not shown).

The operation of the apparatus thus constructed according to the present invention will now be described in the following:

The drive gear 21 driven by the prime mover (not shown) through the output shaft 22 rotates the sun gear 7 and simultaneously the pinion gear 20.

When the sun gear 7 is thus rotated, the rotation of the sun gear 7 is transmitted through the planetary gear 10, shaft 11, planetary gear 8 and sun gear 6 to the crankshaft 1 so that the slider 3 reciprocally moves by the rotation of the crankshaft 1 through the connecting rod 2 similar to that of the conventional device as indicated by the curves $a$ and $b$ in the graphs in FIGS. 1 and 2.

On the other hand, when the pinion gear 20 is thus rotated, the rotation of the pinion gear 20 is transmitted to the crankshaft 17 so that the rack 15 is reciprocally moved through the connecting rod 16 by the rotation of the crankshaft 17 with the result that the sector gear 13 engaged with the rack 15 is rocked around the crankshaft 1 so as to rock the rockable link 12 around the crankshaft 1, and accordingly the planetary gear 8 is alternatively rotated on the outer periphery of the sun gear 6 in the same and opposite directions as and to that of the sun gear 6.

Therefore, the crankshaft 1 which tends to be rotated at constant angular velocity through the sun gear 7, planetary gears 10 and 8 and sun gear 6 by the drive gear 21, is forced to be rotated at irregular angular velocity through the rockable link 12 by way of the pinion gear 20, crankshaft 17 and connecting rod 16 together with the rack 15 from the drive gear 21 by means of the rotation of the planetary gear 8.

If the gear ratio between the respective gears is so determined that the ratio of the speed of rotation of the crankshaft 1 to that of the planetary gear 8 is 1 : $n$, the period of the acceleration and deceleration of the crankshaft 1 during one revolution thereof may be repeated n times. If the decelerated point is provided in the middle of the stroke of the slider 3, the slider 3 can be decelerated at the same point when it moves back and forth, thereby to obtain the reciprocating motion having the decelerated portion $f$ at the middle of the stroke as illustrated by the curves g and e in FIGS. 1 and 2.

Figure 5:
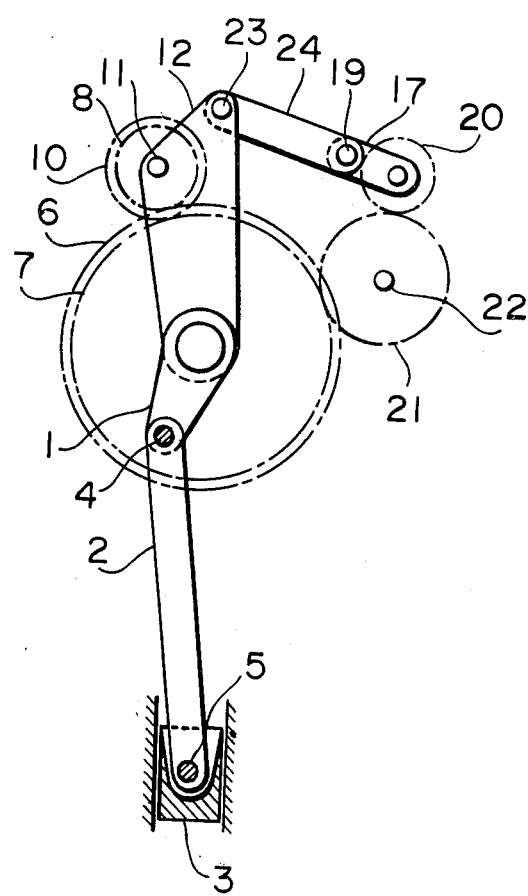
FIG. 5 is a side view of another embodiment of an apparatus according to the present invention.

Referring now to FIGS. 5 and 6, which show another embodiment of an apparatus of the invention, instead of the sector gear 13 and the rack 15 engaged with the teeth 14 of the sector arm 13 shown in FIGS. 3 and 4, the rockable link 12 is rocked by a crank lever mechanism so as to rotate the planetary gear 8 along the sun gear 6. That is, a connecting rod 24 is interposed between the crank pin 19, of the crankshaft 17 rotated through the pinion gear 20 by the drive gear 21 and a lateral rod 23 provided at the rockable link 12.

In operation of this embodiment of the apparatus of the invention, the slider 3 tends to reciprocally move through the sun gear 7, planetary gears 10 and 8, sun gear 6, crankshaft 1 and connecting rod 2 by the drive gear 21 as illustrated by the curves a and b in FIGS. 1 and 2.

However, the drive gear 21 acts to rock the rockable link 12 through the pinion gear 20, crankshaft 17, connecting rod 24 and lateral rod 23 around the crankshaft 1, and thus the planetary gear 8 is alternatively rotated on the outer periphery of the sun gear 6 in the same and opposite directions as and to that of the sun gear 6.

Therefore, the crankshaft 1 which tends to be rotated at a constant angular velocity through the sun gear 7, planetary gears 10 and 8 and sun gear 6 by the drive gear 21, is forced to be rotated around the sun gear 6 at an irregular angular velocity due to the fact that the rockable link 12 rocked through the pinion gear 20, crankshaft 17, connecting rod 24 and lateral rod 23 by the drive gear 21 is rotated around the sun gear 6, as described above, by the planetary gear 8.

Accordingly, the slider 3 makes a reciprocating movement with the period of acceleration and deceleration at the middle of the stroke thereof. If the decelerated point is provided in the middle of the stroke of the slider 3, the slider 3 is decelerated at the same point when it moves back and forth, thereby to obtain the reciprocating motion having the decelerated portion $f$ in the middle of the stroke as illustrated by the curves g and e in FIGS. 1 and 2.

It should be understood from the foregoing description that since the apparatus of the present invention is thus constructed, we can easily generate a reciprocating motion having a decelerated portion in the middle of the stroke. If this apparatus is used as the lifting device or conveying device of an automatic line performing, e.g., loading and unloading operations of articles, the articles can be picked-up or received at the decelerated portion of the stroke to avoid damage thereto.

What is claimed is:

1. An apparatus for generating a reciprocating motion having a decelerated portion within its stroke, comprising:

an input shaft driven in operation at a constant speed, a gear drive means arranged coaxially with said input shaft, a rotatably mounted crankshaft, a first sun gear arranged rotatably coaxially with said crankshaft and in mesh with said gear drive means, a first planetary gear meshing with said first sun gear, an intermediate shaft rigidly mounting thereon said first planetary gear and a second planetary gear, a second sun gear secured to said crankshaft and meshing with said second planetary gear, a reciprocally driven slider driven by said crankshaft, a sector gear supported by said crankshaft and rockably connected to said intermediate shaft and having teeth formed at the end thereof nearest to said crankshaft, means mounted on said crankshaft supporting said intermediate shaft, a gear rack engaged with the teeth of said sector gear, a crank secured to said input shaft for reciprocably driving said gear rack, whereby a decelerated portion is provided in the reciprocating motion of said slider by rocking of said sector gear around said crankshaft by said gear rack.

2. An apparatus according to claim 1, wherein said gear drive means is a gear.

3. An apparatus for generating a reciprocating motion having a decelerated portion within its stroke, comprising:

an input shaft driven in operation at a constant speed, a gear drive means arranged coaxially with said input shaft, a rotatably mounted crankshaft, a first sun gear arranged rotatably coaxially with said crankshaft and in mesh with both said gear drive means, a first planetary gear meshing with said first sun gear, an intermediate shaft rigidly mounting thereon said first planetary gear, a reciprocably driven slider driven by said crankshaft, a rockable link supported by said crankshaft and rockable on said intermediate shaft, means mounted on said crankshaft supporting said intermediate shaft, another crankshaft, a connecting rod connecting said rockable link with said another crankshaft, a pinion gear secured to said another crankshaft and meshing with said drive means, for rocking said rockable link, whereby a decelerated portion is provided in the reciprocating motion of said slider by rocking said first and second planetary gears by rocking of said rockable link.

4. An apparatus according to claim 3, wherein said drive means is a gear.

* * * * *